US012632644B2

(12) United States Patent
Fang et al.

(10) Patent No.: US 12,632,644 B2
(45) Date of Patent: May 19, 2026

(54) SYSTEM FOR ENHANCED INK GESTURE SUPPORT

(71) Applicant: Microsoft Technology Licensing, LLC, Redmond, WA (US)

(72) Inventors: Biyi Fang, Kirkland, WA (US); Xiao Tu, Medina, WA (US); Yibo Sun, Bellevue, WA (US); Xuan Li, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 290 days.

(21) Appl. No.: 18/438,937

(22) Filed: Feb. 12, 2024

(65) Prior Publication Data

US 2025/0258996 A1 Aug. 14, 2025

(51) Int. Cl.
*G06F 40/171* (2020.01)
*G06F 40/14* (2020.01)
*G06F 40/40* (2020.01)

(52) U.S. Cl.
CPC ............ *G06F 40/171* (2020.01); *G06F 40/14* (2020.01); *G06F 40/40* (2020.01)

(58) Field of Classification Search
CPC ......... G06F 40/171; G06F 40/14; G06F 40/40
See application file for complete search history.

(56) References Cited

U.S. PATENT DOCUMENTS

| | | | | |
|---|---|---|---|---|
| 12,443,667 | B2 * | 10/2025 | Yushkina | G06F 16/9574 |
| 2018/0032505 | A1 * | 2/2018 | Hoetzer | G06F 3/00 |
| 2023/0409298 | A1 * | 12/2023 | Ciminelli | G06V 10/945 |
| 2024/0220712 | A1 * | 7/2024 | Zass | G06F 40/35 |
| 2024/0411994 | A1 * | 12/2024 | Siracusano | G06F 40/205 |
| 2025/0005072 | A1 * | 1/2025 | Salowitz | G06F 16/438 |
| 2025/0007870 | A1 * | 1/2025 | Kim | G06F 16/954 |

* cited by examiner

*Primary Examiner* — Keith D Bloomquist

(57) ABSTRACT

Systems, methods, and software are disclosed herein for automating the editing of documents based on ink gestures via an LLM integration in various implementations. In an implementation, a computing device receives an ink gesture made by a user with respect to a document displayed in the user interface of an application. The ink gesture includes ink strokes made on a portion of the document. The computing device generates a prompt for an LLM to obtain suggested revisions to the document, wherein the prompt includes an image of the ink strokes made on the portion of the document. The prompt also includes a document tree indicative of a structure of the document. The computing device surfaces a suggested revision generated by the LLM in response to the prompt in the user interface.

20 Claims, 11 Drawing Sheets

200

201 Receive an ink gesture made by a user with respect to a document in a user interface 203 Generate a prompt for a large language model to obtain suggested revisions to the document 205 Surface a suggested revision generated by the large language model in response to the prompt in the user interface

500

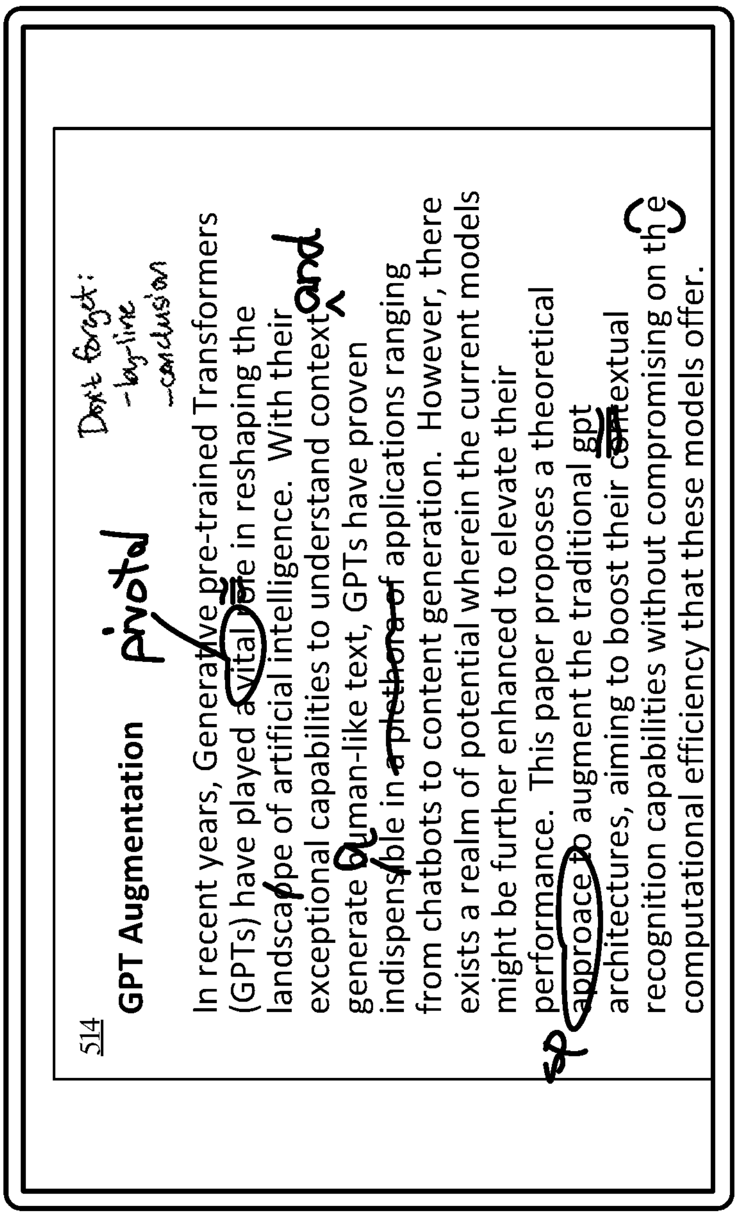

GPT Augmentation    *pivotal*

Don't forget:
- by-line
—conclusion

In recent years, Generative pre-trained Transformers (GPTs) have played a ~~vital role~~ in reshaping the landscape of artificial intelligence. With their exceptional capabilities to understand context *and* generate human-like text, GPTs have proven indispensable in ~~a plethora of~~ applications ranging from chatbots to content generation. However, there exists a realm of potential wherein the current models might be further enhanced to elevate their performance. This paper proposes a theoretical *approach to* augment the traditional gpt architectures, aiming to boost their contextual recognition capabilities without compromising on the computational efficiency that these models offer.

500

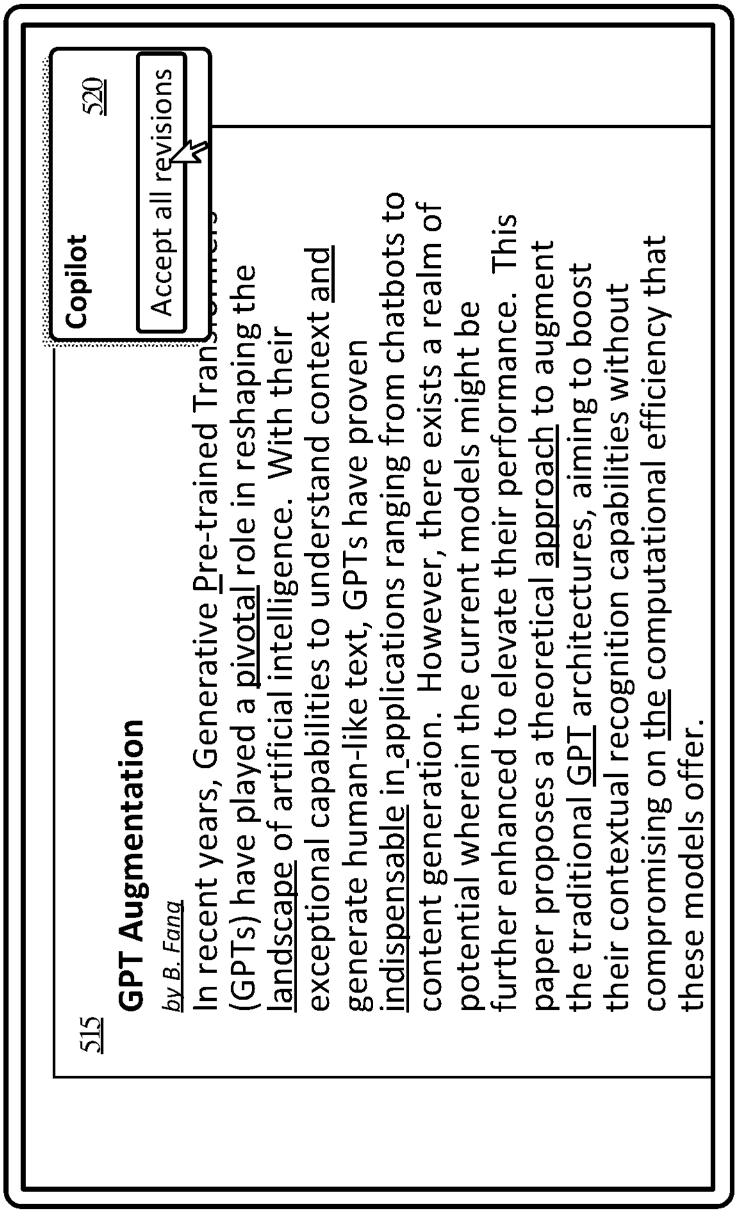

GPT Augmentation

*by B. Fang*

In recent years, Generative Pre-trained Transformers (GPTs) have played a pivotal role in reshaping the landscape of artificial intelligence.  With their exceptional capabilities to understand context and generate human-like text, GPTs have proven indispensable in applications ranging from chatbots to content generation.  However, there exists a realm of potential wherein the current models might be further enhanced to elevate their performance.  This paper proposes a theoretical approach to augment the traditional GPT architectures, aiming to boost their contextual recognition capabilities without compromising on the computational efficiency that these models offer.

Copilot      520

Accept all revisions

500

515

GPT Augmentation

*by B. Fang*

In recent years, Generative Pre-trained Trans
(GPTs) have played a pivotal role in reshaping
landscape of artificial intelligence. With their
exceptional capabilities to understand contex
generate human-like text, GPTs have proven
indispensable in applications ranging from chatbots to
content generation. However, there exists a realm of
potential wherein the current models might be
further enhanced to elevate their performance. This
paper proposes a theoretical approach to augment
the traditional GPT architectures, aiming to boost
their contextual recognition capabilities without
compromising on the computational efficiency that
these models offer.

Copilot                    520

Accept all revisions

Accept spelling revisions

Accept formatting revisions

Accept grammatical
revisions

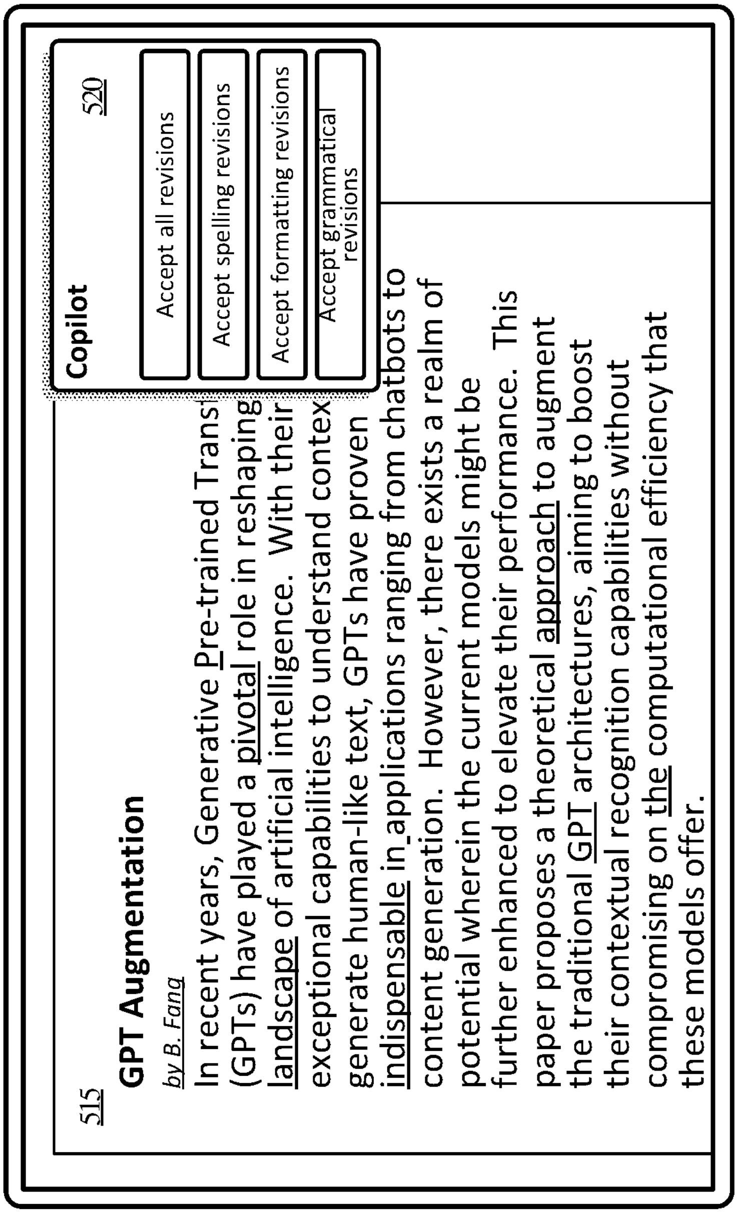

FIGURE 5E

I am now giving you a screenshot of printed text and handwritten edits on top of that. Please recognize the edit suggestions and directly apply the edit suggestions to the printed text. Beware that there could be insert, delete/strikethrough, and swap. Please only include the modified text:

[original text or document tree]

Here is the recognized text from the previous edits:

[output from ink parser]

Here is the screenshot of the text:

[image of text or hyperlink to image of text]

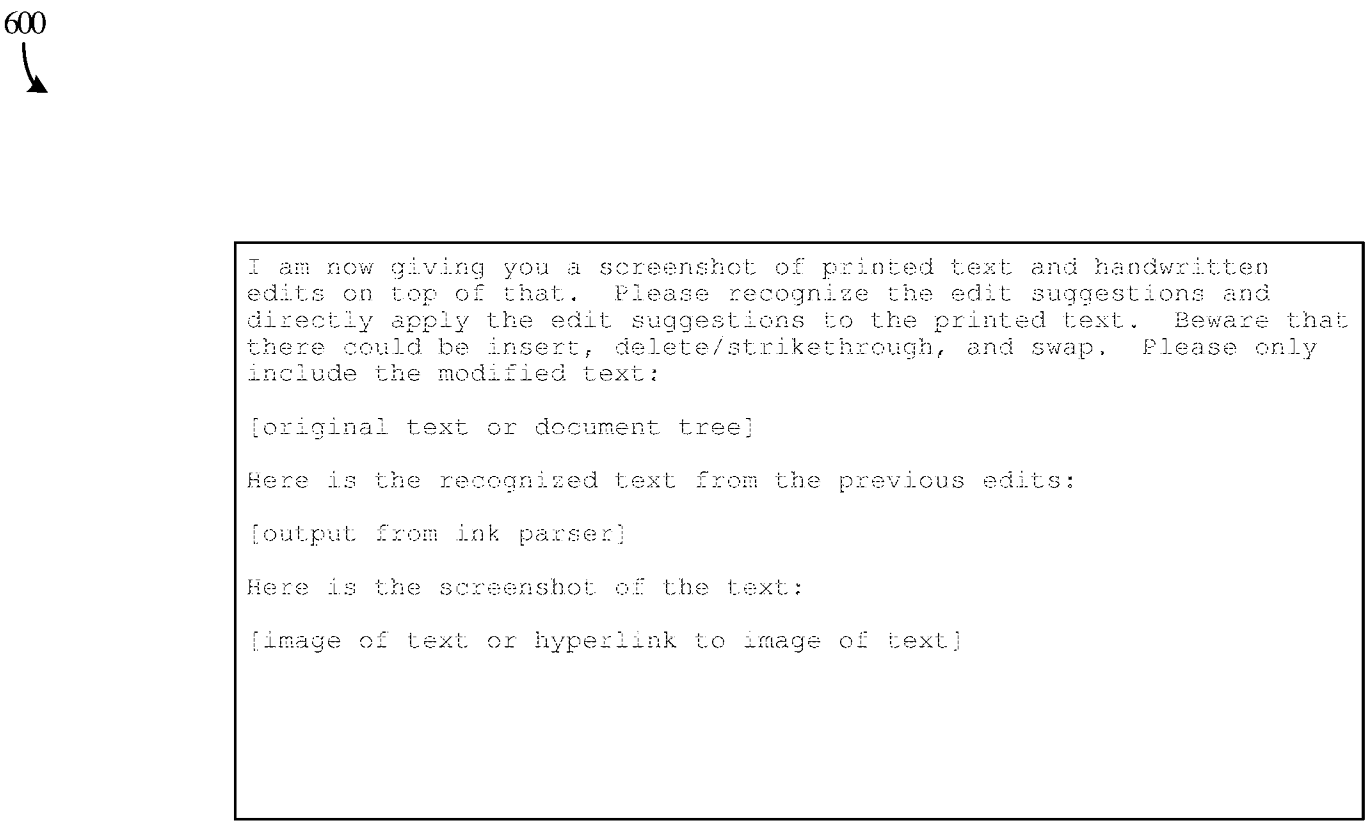

SYSTEM FOR ENHANCED INK GESTURE SUPPORT

TECHNICAL FIELD

Aspects of the disclosure are related to the field of inking technology with respect to documents and large language model integrations for productivity applications.

BACKGROUND

Ink parsing technology enables users to edit documents in digital form using conventional proofreading mark-ups made with a digital pen. Ink parsing technology is trained to identify strokes and recognize stroke groups as mark-up symbols. Enabling this ability may be an artificial intelligence (AI) model trained to recognize mark-up symbols that are hand-drawn and that exhibit variation in size, style, character, etc. An application hosting the document can then edit the document based on the recognized proofreading mark-ups. Ink parsing technology may also include recognizing words, such as hand-written words using optical character recognition (OCR).

Although ink parsing technology can be trained to recognize mark-up symbols in a way that accommodates the variation inherent in hand-drawn symbols, users often come up with their own symbols for editing documents. Because there may be tremendous variation in how users can indicate their intentions in marking up a document, broadening the training of the AI of the ink parsing technology to improve their recognition capability may only ever meet with limited success. It may be impossible to anticipate all the ways users can mark up a document, and scaling the AI to improve the parsers' recognition capabilities will likely reach a point of diminishing returns.

Moreover, when editing a document, a user may write in instructions for revisions rather than using conventional mark-up symbols. Ink parsing technology can be very good at basic tasks such as stroke grouping and entity identification but lack the ability to understand written instructions. Thus, the user may still have to review the revisions performed by the application and manually edit the document according to any written instructions the ink parser is unable to carry out.

OVERVIEW

Technology is disclosed herein for automating the editing of documents based on ink gestures via an LLM integration in various implementations. In an implementation, a computing device receives an ink gesture made by a user with respect to a document displayed in the user interface of an application. The ink gesture includes ink strokes made on a portion of the document. The computing device captures an image of the ink strokes made on the portion of the document. The computing device generates a prompt for a large language model to obtain suggested revisions to the document, wherein the prompt includes the image and a document tree indicative of a structure of the document. The computing device surfaces a suggested revision generated by the large language model in response to the prompt in the user interface.

In various implementations, the prompt tasks the large language model with generating the suggested revisions based on the image of the ink strokes in view of the document tree. The prompt may also include context information relating to the ink gesture which includes a location in the document tree of the portion of the document subject to the ink gesture. In some scenarios, the prompt may also include a different portion of the document that is not subject to the ink gesture.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 5A-5E illustrate a user experience for automated document editing or revisions based on ink gestures via a large language model integration in an implementation.

FIG. 6 illustrates a prompt template for automated document editing or revisions based on ink gestures via a large language model integration in an implementation.

DETAILED DESCRIPTION

Figure 1:
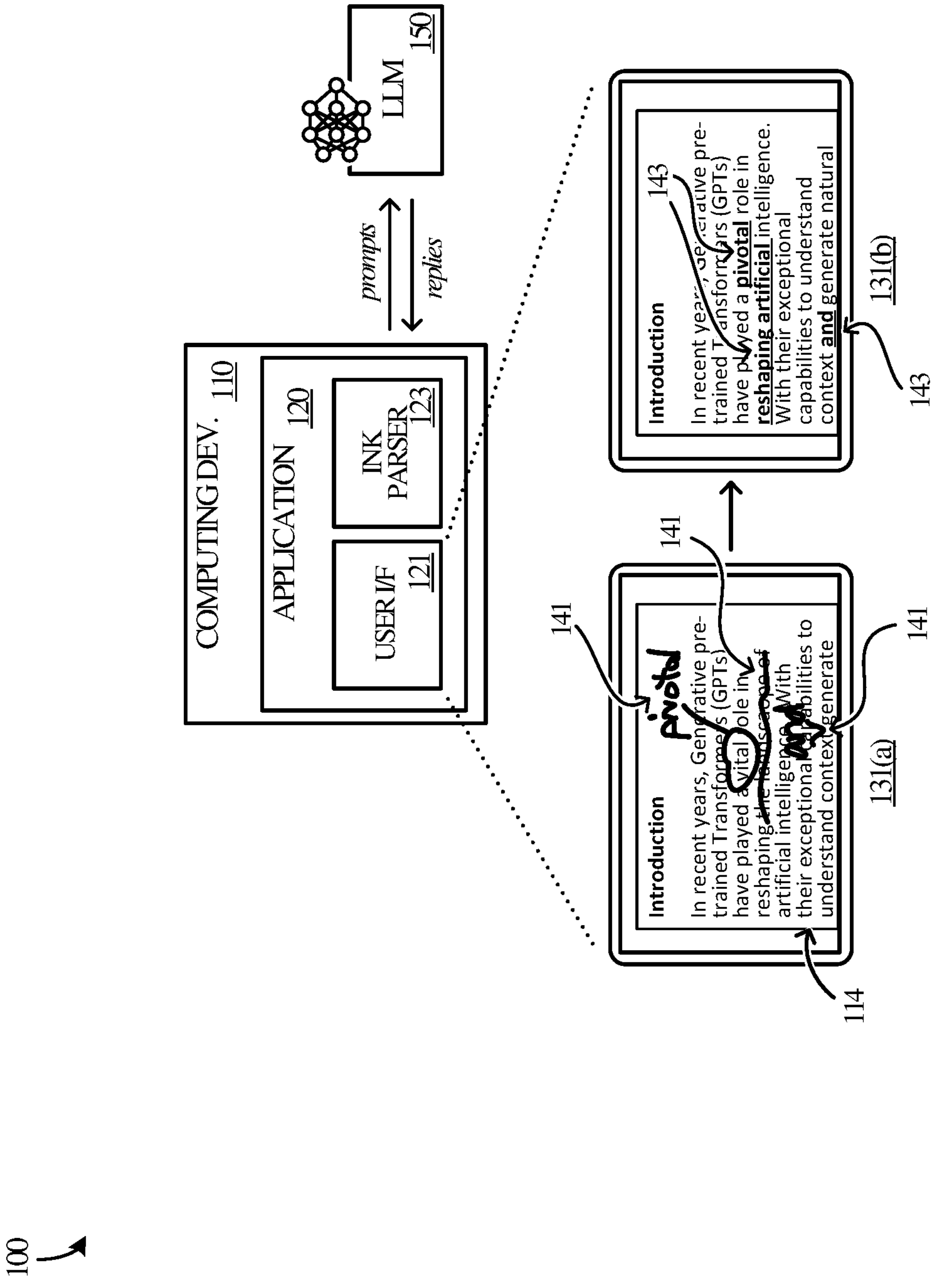
FIG. 1 illustrates an operational environment for document editing according to ink gestures via a large language model integration in an implementation.

Various implementations are disclosed herein for large language model integrations for editing documents based on digital ink technology. The technology disclosed herein enables automated document editing according to ink gestures made by a user using a digital pen. In an implementation, a user, such as an editor, edits the content of a document using a digital pen tool of an application or a digital pen device on a tablet computer. The edits made by the user may include proofreading marks indicating text insertions or deletions, mark-ups indicating how the text is to be reordered, handwritten comments, edits to other elements of the document, such as images, tables, or charts, and the like. An application hosting the document prompts a large language model (LLM) to identify the ink edits or revisions to the document based on the ink gestures. The application applies the edits identified by the LLM to produce a revised copy of the content.

To identify the edits or revisions encompassed by the ink gestures, the LLM is prompted with context information relating to the document, such as the textual content of the document, as well as context information parsed from the ink gestures. In various implementations, the application hosting the document generates the context information using an ink parser. Information about the ink gestures captured by the ink parser is supplied to the LLM to generate a list of edits to the content or a revision of the content responsive to the ink gestures. In some implementations, the LLM capable of receiving inputs in text and image modalities, also receives an image (e.g., screen capture) of the document content including the ink gestures in the prompt. Based on the prompt, the LLM returns output including the edits or revisions to the document content that were identified based on the ink gestures.

LLMs are a type of foundation model for generative artificial intelligence (AI) based on a pre-trained transformer architecture. In various implementations, the LLM is pre-trained on text and image data jointly so that the model can process text input together with image input. For example, GPT-4 (also known as GPT-4V) is a multimodal large language model capable of ingesting text and image data and synthesizing text output. In various implementations, other types of foundation models may be used to generate suggested revisions based on ink gestures according to the technology disclosed herein, such as variational autoencoders, generative adversarial networks, long short-term memory models, and the like.

In various implementations, having prompted the LLM with a document annotated with ink gestures, the application receives a list of suggested revisions derived from the ink gestures from the large language model and presents the suggested revisions in the user interface where the user can implement some or all of the changes. For example, the user may be presented with a list of individual suggested edits or edits grouped according to type (e.g., spelling corrections, formatting edits) which the user can accept or reject. In some scenarios, the LLM may return a new version of the content of the document which the model has revised according to the ink gestures, and the application displays the revised content in the user interface. The revised content may be displayed with the revisions highlighted such that the user can accept or reject the revisions individually or all at once. In various scenarios, the user may be presented with a number of options in the user interface for viewing an annotated document, (e.g., hide or show the ink gestures), an option to view a fully revised version of the content, and options to review and apply, edit, revise, or reject the suggested revisions based on the ink gestures individually or by category.

Revisions indicated by ink gestures include proofreading marks or symbols as well as marks or symbols with associated content. For example, an inked revision may be an insertion caret along with a handwritten word to be inserted. A revision indicated by an ink gesture can also take the form of a handwritten comment or instruction without any symbol. In various implementations, prompts to the LLM include information about revisions indicated by ink gestures that has been captured by an ink parser tool or service of the application hosting the annotated document. Using machine learning algorithms, the ink parser recognizes ink strokes or gestures on documents or other canvases and categorizes or groups them into entities such as shapes, strokes, or groups of strokes which form a shape. The ink parser can also identify words and perform writing layout analysis (i.e., recognizing lines of words or other types of word groups) using optical character recognition (OCR). Using its ability to perform stroke classification and shape detection, the ink parser identifies proofreading mark-ups, words or word groupings or text (e.g., comments, lists), and basic shapes (e.g., circles or other shapes containing text). The ink parser may identify edits from the ink gestures such as spelling, grammatical, punctuation, formatting, and other types of proofreading edits. Information captured by the ink parser from the ink gestures can also include text based on handwritten words or word groupings (e.g., sentences, paragraphs, lists) as well as identification of basic shapes. For example, the ink parser may use OCR to recognize a group of handwritten words which form an editorial comment written in the margin of a document. The prompt may include the text of the comment along with its location relative to the document content (e.g., identifying the paragraph adjacent to which the comment is written).

To provide additional context for the information generated by the ink parser, the prompt may also include an image of the document showing the ink gestures. Because the LLM uses natural language processing, the model can make inferences about the user's intent with respect to the ink gestures that go beyond the capabilities of the ink parser in interpreting the ink gestures. The model's higher-level reasoning capability also allows the model to generate or suggest more sophisticated edits or revisions based on the comments, such as revisions which address the style, tone, level of difficulty, or other characteristic of the targeted content. The model can also return requests for additional information about the subject document or other portions of the document (e.g., a numbered paragraph, a page, a sentence, an image, etc.) based on its interpretation of the comments. Moreover, the LLM, with its multimodal input capability, may also decipher hand-drawn symbols or mark-ups in the document image which may be unknown or ambiguous to the ink parser.

Large language models (LLMs) of the technology disclosed herein are a type of generative artificial intelligence (AI) or foundation model which processes and generates natural language text. LLMs are trained on massive amounts of text data and learn to generate coherent and contextually relevant responses given a prompt or input text. LLMs are capable of understanding and generating sophisticated language based on their trained capacity to capture intricate patterns, semantics and context dependencies in textual data. In some scenarios, LLMs such as GPT-4 (also known as GPT-4V) may incorporate additional modalities, such as combining images or audio input along with textual input to generate multimodal outputs. Types of LLMs include language generation models, language understanding models, and transformer models.

Multimodal models are a class of foundation model which extend their pre-trained knowledge and representation capabilities to handle multimodal data, such as text, image, video, and audio data. Multimodal models may leverage techniques like attention mechanisms and shared encoders to fuse information from different modalities and create joint representations. Learning joint representations across different modalities enables multimodal models to generate multimodal outputs that are coherent, diverse, expressive, and contextually rich. For example, multimodal models can generate a caption or textual description of the given image by extracting visual features using an image encoder, then feeding the visual features to a language decoder to generate a descriptive caption. Similarly, multimodal models can generate an image based on a text description (or, in some scenarios, a spoken description transcribed by a speech-totext engine). In an implementation of the technology disclosed herein, the prompt to the LLM for revisions may include the textual output of the ink parser interpreting the ink gestures but also an image of the document with the ink gestures, such as a screen-capture. Thus, the LLM can generate its output (e.g., edits or revisions to the document) based on information supplied in a text-based format as well as image data.

More generally, foundation models for implementing the technology disclosed herein include large-scale generative artificial intelligence (AI) models trained on massive quantities of diverse, unlabeled data using self-supervised, semi-supervised, or unsupervised learning techniques. Foundation models may be based on a number of different architectures, such as generative adversarial networks (GANs), variational auto-encoders (VAEs), and transformer models, including multimodal transformer models. Foundation models capture general knowledge, semantic representations, and patterns and regularities in or from the data, making them capable of performing a wide range of downstream tasks. In some scenarios, an LLM may be fine-tuned for a specific downstream task. Types of foundation models may be broadly classified as or include pre-trained models, base models, and knowledge models, depending on the particular characteristics or usage of the model. Foundation models may be multimodal or unimodal depending on the modality of the inputs.

Multimodal models include visual-language foundation models, such as CLIP (Contrastive Language-Image Pre-training), ALIGN (A Large-scale ImaGe and Noisy-text embedding), and VILBERT (Visual-and-Language BERT), for computer vision tasks. Examples of visual multimodal or foundation models include DALL-E, DALL-E 2, Flamingo, Florence, and NOOR. Types of multimodal models may be broadly classified as or include cross-modal models, multi-modal fusion models, and audio-visual models, depending on the particular characteristics or usage of the model.

Transformer models, including transformer-type foundation models and transformer-type LLMs, are a class of deep learning models used in natural language processing (NLP). Transformer models are based on a neural network architecture which uses self-attention mechanisms to process input data and capture context relationships between words in a sentence or text passage. Transformer models weigh the importance of different words in a sequence, allowing them to capture long-range dependencies and relationships between words. GPT (Generative Pre-trained Transformer) models, BERT (Bidirectional Encoder Representations from Transformer) models, ERNIE (Enhanced Representation through kNowledge IntEgration) models, T5 (Text-to-Text Transfer Transformer), and XLNet models are types of transformer models which have been pretrained on large amounts of text data using a self-supervised learning technique called masked language modeling. Indeed, large language models, such as ChatGPT and its brethren, have been pretrained on an immense amount of data across virtually every domain of the arts and sciences. This pretraining allows the models to learn a rich representation of language that can be fine-tuned for specific NLP tasks, such as text generation, language translation, or sentiment analysis.

Technical effects of the technology disclosed herein include the ability to streamline document editing by automating the process of revising a document based on handwritten ink gestures and ink gestures. Thus, a user, such as an editor, who edits documents using handwritten ink gestures and comments need not resort to application markup tools and commenting tools to facilitate automated editing. Instead, the user can continue to use what may be to the user a more intuitive method of document editing but with automated implementation of those edits. Moreover, not all users will adhere to conventional proofreading marks and may be inclined to use a more fluid or more intuitive manner of marking up a document which may be unique to the user. To expand the capabilities of ink parsing technology to accommodate the myriad ways in which users might mark up a document would require scaling the technology to an unworkable capacity or customizing the ink parsing technology to the particular user. But even with broadening or customizing the ability of the ink parser, the ink parsing technology would still not be capable of higher-level or semantic reasoning to augment its accuracy, such as with respect to the use of ambiguous symbols.

LLMs are capable of higher-level or semantic understanding beyond the capability of ink parsing technology. Beyond automating and streamlining the task of manually revising a document, by integrating the use of a LLM with ink parsing technology, the LLM can not only interpret unique or custom mark-ups in a manner that far exceeds the capabilities of an ink parser tool but can also perform higher-level document editing and revisions. To provide context information for interpreting ink gestures, the prompt sent to the LLM is augmented by the knowledge and capabilities of the ink parser in performing lower-level recognition tasks, in a form of Retrieval Augmented Generation (RAG). By supplying the LLM with the annotated document including information captured by an ink parser, the LLM can identify edits or revisions beyond basic low-level editing which will be more accurate and contextually relevant. By streamlining the process of document editing based on ink gestures, the technology disclosed herein will improve user productivity.

Turning now to the figures, FIG. 1 illustrates operational environment 100 for document editing based on ink gestures via an LLM integration in an implementation. Operational environment 100 includes computing device 110 which hosts application 120 including user interface 121 and ink parser 123. User interface 121 displays user experiences 131(*a*) and 131(*b*) of application 120. Computing device 110 is in communication with LLM 150, including sending prompts to LLM 150 and receiving output generated by LLM 150 in accordance with its training.

Figure 7:
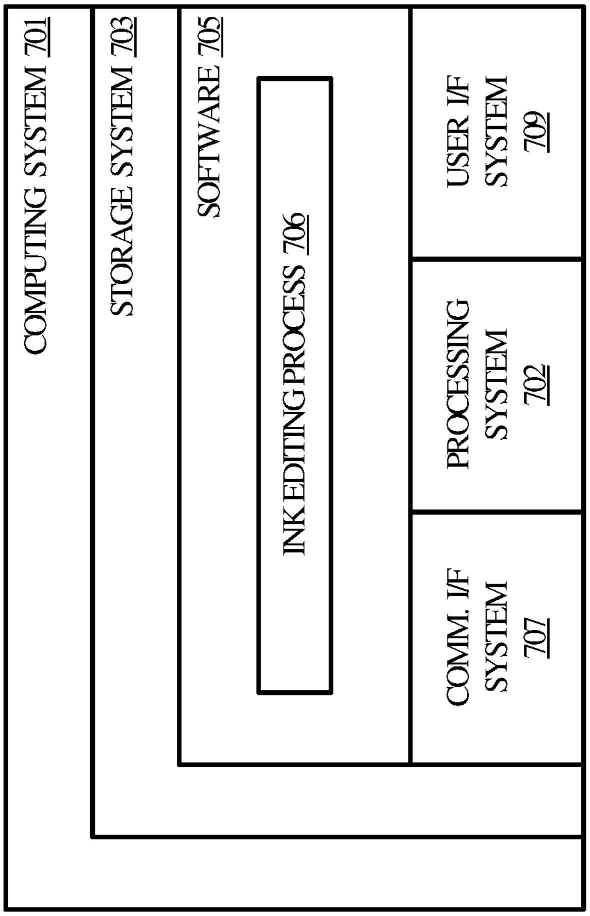
FIG. 7 illustrates a computing system suitable for implementing the various operational environments, architectures, processes, scenarios, and sequences discussed below with respect to the other Figures.

Computing device 110 is representative of a computing device of which computing system 701 in FIG. 7 is broadly representative, such as a laptop or desktop computer, a mobile computing device, or a server computing device. Computing device 110 communicates with LLM 150 via one or more internets and intranets, the Internet, wired or wireless networks, local area networks (LANs), wide area networks (WANs), and any other type of network or combination thereof.

Application 120 is representative of a software application by which a user can create and edit content of document, such as a word processing application, a slide presentation, or other productivity application, and which can generate prompts for submission to large language models, such as LLM 150. Application 120 may execute locally on a user computing device, such as computing device 110, or application 120 may execute on one or more servers in communication with computing device 110 over one or more wired or wireless connections, causing user interface 121 to be displayed on computing device 110. In some scenarios, application 120 may execute in a distributed fashion, with a combination of client-side and server-side processes, services, and sub-services. For example, the core logic of application 120 may execute on a remote server system with user interface 121 displayed on a client device. In still other scenarios, computing device 110 is a server computing device, such as an application server, capable of displaying user interface 121, and application 120 executes locally with respect to computing device 110.

Application 120 executing locally with respect to computing device 110 may execute in a stand-alone manner, within the context of another application such as a presentation application or word processing application, or in some other manner entirely. In an implementation, application 120 hosted by a remote application service and running locally with respect to computing device 110 may be a natively installed and executed application, a browser-based application, a mobile application, a streamed application, or any other type of application capable of interfacing with the remote application service and providing local user experiences displayed in user interface 121 on the remote computing device.

Computing device 110 executes application 120 locally that provides a local user experience, as illustrated by user experiences 131(*a*) and 131(*b*) via user interface 121. Application 120 running locally with respect to computing device 110 may be a natively installed and executed application, a browser-based application, a mobile application, a streamed application, or any other type of application capable of interfacing with LLM 150 and providing a user experience displayed in user interface 121 on computing device 110. Application 120 may execute in a stand-alone manner, within the context of another application, or in some other manner entirely.

In user interface 121, user experiences 131(*a*) and 131(*b*) are representative of a local user experience hosted by application 120 in an implementation. User interface 121 displays document 114 hosted by application 120. Document 114 may be a canvas of a productivity application such as a text or word processing document, a slide presentation, or the like. Document 114 includes textual content and ink gestures 141. Ink gestures 141 include graphical objects created by a user using a digital pen tool or device. Ink gestures 141 can include handwritten ink gestures or mark-ups to indicate edits to be made to the document content, such as proofreading marks. Ink gestures 141 can also include handwritten comments or hand-drawn shapes added by a user to document 114 which relate to the subject matter of the content.

LLM 150 is representative of a deep learning model, such as BERT, ERNIE, T5, XLNet, or of a generative pretrained transformer (GPT) computing model or architecture, such as GPT-3®, GPT-3.5, ChatGPT®, or GPT-4/4V. LLM 150 is hosted by one or more computing services which provide services by which application service 120 can communicate with LLM 150, such as an application programming interface (API). In communicating with application service 120, LLM 150 may send and receive information (e.g., prompts and replies to prompts) in data objects, such as JSON objects. LLM 150 may be implemented in the context of one or more server computers co-located or distributed across one or more data centers.

A brief operational scenario of operational environment 100 follows. A user of computing device 110 interacts with application 120 hosting document 114 displayed in user interface 121 as illustrated in user experiences 131(*a*) and 131(*b*). As illustrated in user experience 131(*a*), the content of document 114 is displayed along with ink gestures 141 constituting digital ink edits or revisions to be made to the content. Application 120 receives user input indicative of the user's intent to implement the revisions indicated by ink gestures 141 into document 114. In response to the user input, application 120 configures a prompt for submission to LLM 150 to generate suggested edits according to ink gestures 141. The prompt includes the content of the document which may be the textual content of the document or a document tree which is indicative of the structure of document 114. Application 120 also includes an image of document 114 (e.g., a Portable Network Graphics (PNG) or Joint Photographic Experts Group (JPEG) image format) which captures ink gestures 141 as they were added to the document content in the prompt to LLM 150.

In an implementation, in configuring the prompt, application 120 receives output from ink parser 123 which includes identification or interpretation of the proofreading marks or symbols of ink gestures 141, text corresponding to handwritten words based on OCR of ink parser 123 (e.g., recognizing the word "pivotal"), identification of basic shapes of ink gestures 141, and other context information, such as position information of ink gestures 141 with respect to the content. Application 120 configures the prompt including output from ink parser 123.

In an example of the complementary capabilities of ink parser 123 and LLM 150, although ink parser 123 may recognize the word "pivotal" written on document 114, it may not understand the user's intent to replace the word "vital." However, presented with ink gestures 141 and ink parser 123's identification of the word "pivotal," LLM 150 identifies the user's intention to replace the word "vital" with the word "pivotal" based on the circling of the word "vital" and the line extending between the circle and the word "pivotal." Together, the technology disclosed herein integrates the respective capabilities to enable more advanced or more sophisticated document revisions than either capability alone.

Upon submitting the prompt to LLM 150, application 120 receives output including suggested revisions to the content of document 114 based on ink gestures 141. In some scenarios, the output from LLM 150 includes a list of the suggested revisions which may be surfaced in the user interface for the user to select which edits to implement or which application 120 can implement directly in document 114. In some scenarios, LLM 150 is tasked with revising the content of document 114 and returning a revised version of the content. In still other scenarios, LLM 150 returns both a list of the suggested revisions and the revised version of the content to application 120.

As illustrated in user experience 131(*b*), when application 120 receives a response to the prompt from LLM 150, application 120 displays a new version of document 114 including revisions 143 identified by the model based on ink gestures 141. The revised version includes highlights to the content to visually distinguish the changes from the unaltered text for the convenience of the user. Based on the prompt, revisions 143 in this exemplary scenario include edits to the textual content of document 114—replacing, deleting, and inserting text. In user experience 131(*b*), the user may be presented with the option to accept or reject each of revisions 143 individually or in total.

Figure 2:
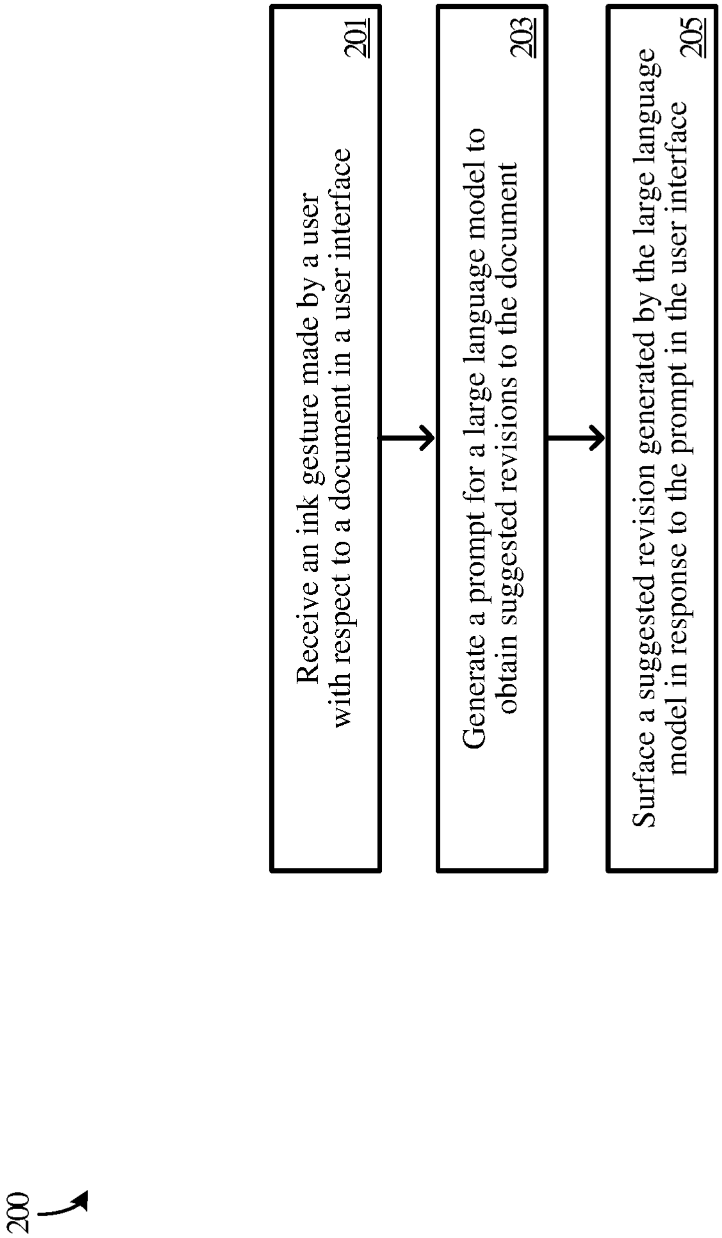
FIG. 2 illustrates a process for document editing according to ink gestures via a large language model integration in an implementation.

FIG. 2 illustrates a method of editing a document based on ink gestures via an LLM model integration in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

A computing device hosts an application which displays a document in a user interface. The computing device receives an ink gesture made by the user with respect to the document in the user interface (step 201). In an implementation, the user uses digital ink technology to add ink gestures to the document in the form of ink strokes on a portion of the document. The ink gestures may form symbols or comments indicative of changes to be made to the content of a portion of the document. For example, the user may mark up the document by adding proofreading marks using a digital pen tool of the application. The user may indicate content to be deleted by drawing a large "X" over the content. The user may handwrite a comment or suggestion in the margin of the document. The portion of the document that is edited or marked up by the user can include text (e.g., sentence, paragraph), images, tables, charts, and the like.

The computing device generates a prompt for an LLM to obtain suggested revisions to the document (step 203). In an implementation, the computing device generates a prompt which includes an image of the ink strokes on the portion of the document, such as a screen capture or file export by the application. In some implementations, the image includes at least the portion of the document that is subject to an ink gesture. The image may also include (or the prompt may also include) other portions of the document which do not have ink gestures. For example, the image in the prompt may be of a page of the document in which a single paragraph is annotated with an ink gesture. By providing content of the document that is not digitally inked, such as content surrounding the inked portion, the LLM receives more context for generating its suggested revisions which may improve the relevance of its suggestion.

The prompt also includes a document tree indicative of the structure of the document. The document tree may be an internal representation of the document. The document tree may include document content and metadata in a parse-able data structure used by the application for formatting, displaying, and otherwise handling the document. For example, the document tree may be a document object model (DOM) which organizes the elements and structure of a document in a hierarchy of data objects so that the application can manipulate and interact with the content programmatically. The prompt may include an instruction which tasks the LLM with generating the suggested revisions based on the image of the ink strokes on the portion of the document in view of the document tree. With the prompt configured, the computing device submits the prompt to the LLM, for example, by transmitting the prompt to the model via an application programming interface (API) supported by the model or by a service hosting the model.

In an implementation, when the prompt is submitted to the LLM, the model returns a response which includes suggested edits or revisions to the content of the document. The response may also include a revised version of the content, such as a revised paragraph to replace an existing paragraph. For example, where an ink gesture includes a comment suggesting a revision to the style or tone of a paragraph, the LLM may return a rewrite of the paragraph in accordance with the comment. In some cases, the suggested revisions may apply to formatting or organization of the document. In some implementations, the response may include a list of suggested revisions in a format which can be directly applied by the application, such as a set of revisions to data objects of the document tree that can be parsed from the response and implemented by the application.

Continuing with process 200, the computing device surfaces a suggested revision generated by the LLM in response to the prompt in the user interface (step 205). In an implementation, revisions suggested by the LLM may be surfaced to the user in a number of ways and according to options selected by the user. For example, the LLM may be tasked with applying the suggested revisions to the content to generate an updated version of the content. Alternatively, the model may be tasked with listing the suggested revisions so they can be surfaced in the user interface for the user to implement individually or categorically. The list of suggested revisions generated by the model may also be incorporated into the content by the application which then displays the revised content in the user interface. When displaying textual revisions, the revised text may be formatted to be visually distinct so that the user can accept or reject the revisions individually.

Upon surfacing the suggested revision, the user may provide input which causes the application to revise the document according to the ink gesture. In various implementations, the computing device may store suggested revisions or a revised version of the document upon receiving the response to the prompt from the LLM, for example, when revisions have been accepted by the user.

In some scenarios, to identify revisions indicated by the ink gestures, the computing device receives context information relating to the ink gestures from an ink parser of the application and includes the context information in the prompt. In various implementations, the ink parser is an application tool or service which is capable of recognizing and interpreting ink gestures in the form of known or conventional proofreading marks or symbols, along with recognizing handwritten words using OCR, word groupings, and basic shapes such as lines or circles. Using output provided by the ink parser, the computing device augments the prompt with the context information about the ink gestures which the LLM can access in generating a more comprehensive understanding of the edits indicated by the ink gestures according to the model's higher-level reasoning and semantic understanding.

Referring again to FIG. 1, operational environment 100 includes a brief example of process 200 as employed by elements of operational environment 100 in an implementation. Computing device 110 runs application 120 including causing a local user experience to be displayed via user interface 121. Application 120 may execute locally with respect to computing device 110, or computing device 110 may host application 120 which executes on one or more server computing devices remote from and in communication with computing device 110, or application 120 may execute in distributed, client-server fashion.

The steps of composing document 114, editing document 114 using digital ink, and revising document 114 based on the revisions can occur in various ways. For example, document 114 may be composed by a first user and sent to a second user, such as an editor, for editing. The second user may add ink gestures 141 suggesting revisions to document 114 using a digital pen tool or device and return document 114 with the ink gestures to the first user. The first user may view document 114 in user interface 121 and perform steps of process 200 to incorporate the revisions into document 114. In another scenario, a user may compose document 114, add ink gestures 141 to document 114, and then perform steps of process 200 to incorporate the revisions into document 114.

In operational environment 100, application 120 hosting document 114 causes document 114 to be displayed in user interface 121. In user experience 131(*a*), the content of document 114 is displayed along with ink gestures 141. The content of the portion of document 114 displayed in user interface 121 includes textual content. Other portions of document 114 which may be edited by a user using digital ink can include content such as images, tables, lists, charts, and the like. Ink gestures 141 comprise graphics objects which symbolize or indicate editing and/or proofreading marks, symbols, comments, etc. which suggest revisions to the content.

Application 120 receives user input requesting document 114 be revised according to ink gestures 141. For example, application 120 may display an application assistant or "Copilot" pane in user interface 121 by which the user can select various options relating to ink gestures 141, such as an option to show or hide ink gestures 141 or to revise document 114 according to ink gestures 141. In electing to implement ink gestures 141 to revise document 114, the user may be presented with options to implement the ink gestures individually, categorically, and in full. The user may also indicate whether to make the implemented revisions visually distinct from unaltered text for the convenience of the user to review the changes. In some scenarios, the prompt may task LLM 150 with indicating a confidence level for each of the revisions, and application 120 may automatically implement revisions for which LLM 150 has indicated high confidence.

Having received user input requesting implementation of ink gestures 141, application 120 configures a prompt for LLM 150 to obtain suggested revisions based on ink gestures 141. In configuring a prompt for LLM 150, application 120 includes content of document 114, such as the portions of document 114 subject to ink gestures 141. The image may be PNGs of capturing annotated portions of document 114. The prompt also includes a document tree of data objects by which the elements and structure of document 114 are organized.

In various implementations, application 120 submits ink gestures 141 to ink parser 123. Ink parser 123 may be a tool or service of application 120 or a stand-alone service or application in communication with application 120 via an API. In an implementation, ink parser 123 parses ink gestures 141 to identify proofreading marks or symbols added to the textual content of document 114. For example, ink parser 123 may interpret ink gestures 141 as revisions to the textual content according to the type and location of each revision. The revisions may be identified by ink parser 123 according to a rubric of conventional or commonly understood proofreading mark-ups. In addition to identifying proofreading marks, ink parser 123 can also identify handwritten text using OCR technology, along with word groupings or writing analysis such as paragraphs, lists, and the like. Ink parser 123 returns information generated based on parsing ink gestures 141 to application 120 which includes the information in the prompt to LLM 150.

In some implementations, ink parser 123 may revise the document tree of document 114 according to ink gestures 141 and output a revised document tree. In other implementations, ink parser 123 generates a tree representation of the information captured or parsed from ink gestures 141, and application 120 may merge the ink parser tree into the document tree (e.g., merging data objects of the ink parser tree into the document tree) to revise the document tree. The revised document tree is then included in the prompt.

The prompt configured by application 120 for submission to LLM 150 which tasks the model with generating suggested revisions based on the image of the annotated portion of document 114 and the document tree. The prompt may include instructions to LLM 150 with regard to formatting its response. For example, the prompt may task the model with suggesting revisions to the content of document 114 and returning the revised content. For another example, the prompt may task the model with generating revisions to data objects of the document tree in accordance with the model's interpretation of ink gestures 141 in view of the context information provided by ink parser 123, textual content copied directly into the prompt, the document tree, and/or the document image. The prompt may also instruct the model to generate a corresponding list of the suggested revisions in a natural language format for display in user interface 121. The prompt may also instruct LLM 150 to return requests for additional information relating to document 114 as necessary. For example, if LLM 150 determines that a suggested revision depends on content of document 114 which has not been supplied in the prompt, the model may return a request to application 120 to obtain the content. Application 120 submits the prompt to LLM 150 and receives a response generated by the model in response to the prompt.

User experience 131(*b*) illustrates a revised version of document 114 based on the response to the prompt received from LLM 150. The revised version includes suggested revisions 143 generated by the model based on ink gestures 141 and context information supplied in the prompt. Suggested revisions 143 may be displayed in a visually distinct format for the convenience of the user in reviewing the changes, as illustrated in user experience 131(*b*). In some implementations, the user may be presented with the option to accept or reject the changes individually. For example, application 120 may display hovering buttons near each of suggested revisions 143. In some implementations, application 120 may display suggested revisions 143 as a list in a natural language format generated by LLM 150, such as in an application assistant pane in user interface 121. Using the list, the user can view and/or selectively implement individual ones of suggested revisions 143.

Figure 3:
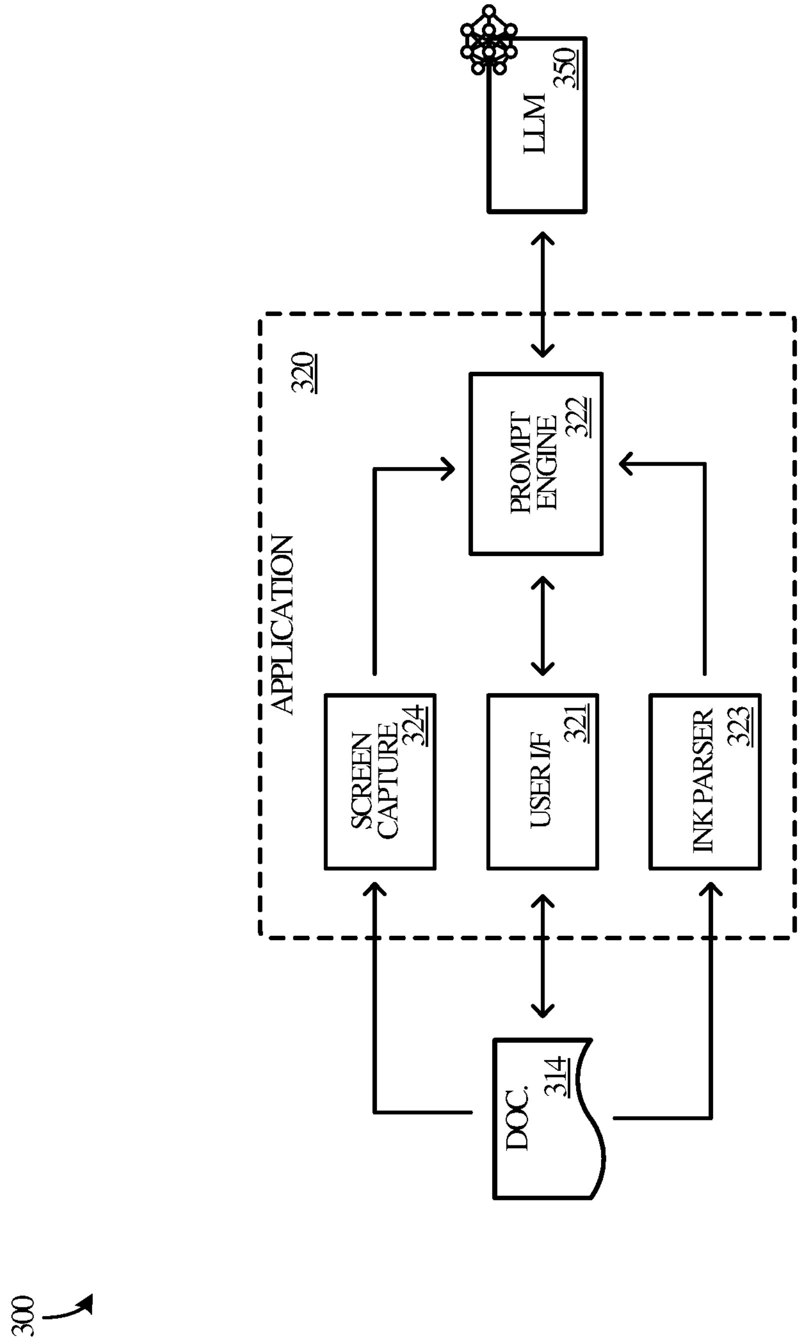
FIG. 3 illustrates an operational environment for document editing according to ink gestures via a large language model integration in an implementation.

FIG. 3 illustrates operational architecture 300 for automated document revisions based on digital ink gestures via an LLM integration in an implementation. In operational architecture 300, application 320, of which application 120 of FIG. 1 is representative, communicates with LLM 350 using prompt engine 322 for generating and submitting prompts and receiving responses to the prompts. Communication between prompt engine 322 and LLM 350 may be transmitted via an API (not shown) hosted by LLM 350.

Application 320 is representative of a software application capable of hosting document 314 which is representative of a word processing document, a slide presentation, or other type of productivity document or file to which a user may edit by applying ink gestures. Application 320 may include tools or services for performing various tasks. For example, application 320 includes user interface 321 for displaying document 314 on a computing device. Application 320 also includes screen capture functionality 324 for capturing an image of document 314 and ink parser 323 for parsing ink gestures of document 314 to identify proofreading symbols and other editing marks.

Application 320 may execute locally on a user computing device, such as a client or user computing device, or application 320 may execute on one or more servers in communication with a user computing device over one or more wired or wireless connections, causing user interface 321 to be displayed on the user computing device. In some scenarios, application 320 may execute in a distributed fashion across client and server devices.

LLM 350 is representative of a multi-modal pre-trained generative AI model of which LLM 150 of FIG. 1 is representative. LLM 350 can receive prompts of various modalities such as text data and image data and generate output in text form based on the prompts.

Prompt engine 322 of application 320 receives requests to generate a prompt based on user input received in user interface 321, configures prompts for LLM 350, transmits prompts to LLM 350, and returns output for display in user interface 321 based on responses to the prompt received from LLM 350. To generate a prompt in relation to document 314, prompt engine 322 may receive information from other services of application 320. For example, prompt engine 322 may also include an image of document 314 received from screen capture functionality 324 which captures images of portions of document 314 including annotated portions of the document. Prompt engine 322 may receive a document tree of document 314 from application 320. The document tree may be a data structure including hierarchy of data objects which encompass the elements and structure of document 314. In various implementations, the prompt may include the document tree of the entirety of document 314 including portions that do not include ink gestures along with portions that are annotated by ink gestures. Alternatively, the prompt may include only portions of the document tree corresponding to the annotated portions of document 314. In some implementations, LLM 350 receives a series of prompts requesting suggested revisions, such that the content of document 314 is apportioned to avoid exceeding a token limit of the model.

In addition to the document tree and images of document 314, prompt engine 322 may also include information relating to ink gestures in document 314 from ink parser 323 in the prompt. Ink parser 323 generates information relating to the ink gestures by parsing the ink gestures to identify proofreading marks, recognize words and word groupings in the ink gestures using OCR and identifying basic hand-drawn shapes or containers from among the ink gestures. The context information supplied by ink parser 323 may also include information which relates the ink gestures to elements of and/or the structure of document 314. For example, the information may relate the ink gestures to data objects of a document tree of document 314. In some scenarios, ink parser 323 generates and returns data objects corresponding to the ink gestures which are merged into the document tree or generates a version of the document tree or document tree data objects revised based on the ink gestures.

Figure 4:
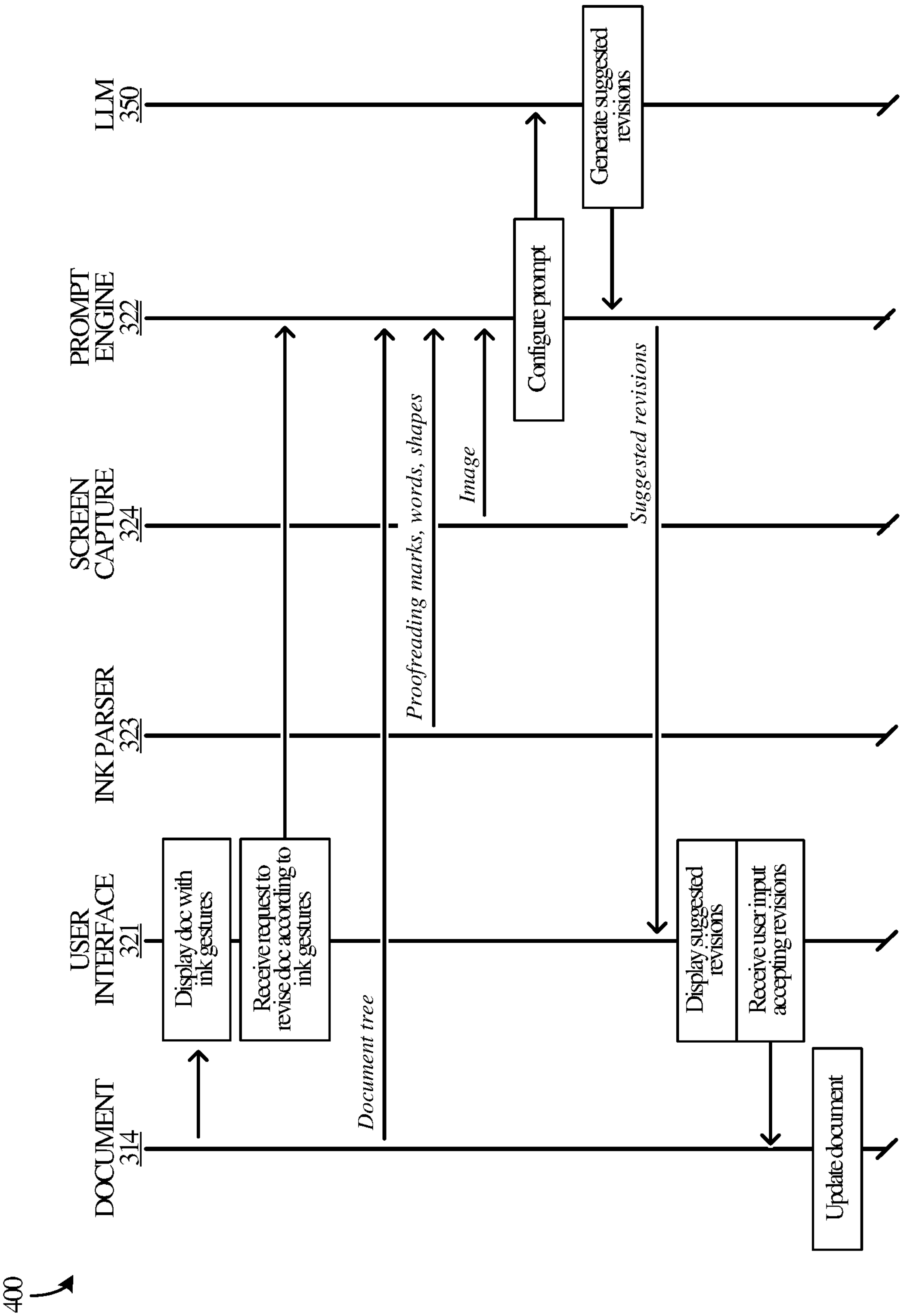
FIG. 4 illustrates an operational scenario for document editing according to ink gestures via a large language model integration in an implementation.

FIG. 4 illustrates operational scenario 400 for automated document editing based on ink gestures via an LLM integration in an implementation, referring to elements of operational architecture 300. In operational scenario 400, application 320 displays user interface 321 by which a user can interact with application 320 to perform various tasks with respect to document 314. Document 314 including ink gestures is displayed in user interface 321. In some implementations, user interface 321 displays an application assistant pane by which the user can interact with application 320 with respect to ink gestures in document 314.

User interface 321 receives user input indicative of a request by the user to revise document 314 according to the ink gestures. For example, the user may click a graphical button in the application assistant pane to edit document 314 according to the ink gesture. The user input causes prompt engine 322 to generate a prompt for LLM 350 to identify revisions to be performed on document 314 based on the ink gestures.

To configure the prompt, prompt engine 322 receives information relating to document 314 and its ink gestures from application 320 and/or its services. Prompt engine 322 receives a document tree of document 314 including data objects which determine the structure and elements of document 314, such as text elements (e.g., title, paragraphs), formatting elements, organizational elements (e.g., pages, sections), header/footer elements, graphics objects (e.g., ink gestures), images, tables, lists, and so on. Prompt engine 322 also receives context information parsed from the ink gestures by ink parser 323. Prompt engine 322 also receives an image of document 314 (e.g., a PNG image or PDF file) which shows the ink gestures as they have been added to or are displayed in document 314.

Upon receiving the information relating to document 314 from application 320 and its services, prompt engine 322 assembles the prompt according to a prompt template for requesting revisions based on ink gestures from LLM 350. The prompt template may include rules or instructions for LLM 350 in generating its output. The prompt template, in a natural language style or format, may include a rule which tasks the LLM with suggesting edits or revisions to the content of document 314 in view of the context information about the ink gestures identified by ink parser 323. In an implementation, the prompt template tasks LLM 350 with revising the content and returning the revised content in its response. In some implementations, the prompt template tasks LLM 350 with generating its output in a parse-able format which can be incorporated directly into the document tree of document 314. For example, the parse-able format may include data objects of the document tree which have been revised by LLM 350 according to the revisions identified from the ink gestures. To revise document 314, the revised data objects can then be copied into the document tree, overwriting the corresponding existing data objects. The prompt template may also instruct LLM 350 to generate a list of natural language descriptions of the suggested revisions which can be displayed to the user in user interface 321, such as in an application assistant pane.

With the prompt configured, prompt engine 322 submits the prompt to LLM 350 which generates suggested revisions according to the ink gestures and returns a response. Upon receiving the response from LLM 350, prompt engine 322 parses the output to extract the suggested revisions identified by LLM 350 and supplies the suggested revisions to application 320. In various implementations, the revisions are returned in the form of revised content or as revised data objects for implementation in the document tree. The response may also include a list of corresponding natural language descriptions of the suggested revisions for display in user interface 321.

Upon receiving the suggested revisions from prompt engine 322, application 320 may implement the revisions and display a revised version of document 314. In some implementations, each of the suggested revisions is displayed in a manner that visually distinguishes the revisions from the unaltered content. For example, the revised version of document 314 may be displayed in a "reviewing" mode with the revisions may be displayed in a marked-up form (e.g., underlined in a different font color). In some scenarios, each of the suggested revisions may be displayed with a graphical device by which the user can accept or reject the revision. In some implementations, the list of suggested revisions may be displayed along with graphical devices by which the user can select which of the revisions to view and/or which to accept or reject. As application 320 receives user input indicating the user accepting suggested revisions, application 320 updates the content or document tree of document 314 accordingly. For example, as a revision is accepted, application 320 may update the document tree by overwriting the corresponding data object with a replacement data object generated by LLM 350.

FIGS. 5A-5E illustrates user experience 500 for document revisions based on ink gestures via an LLM integration in an implementation. User experience 500 depicts a user interface displaying document 514 including several graphics objects comprising hand-written ink gestures. The ink gestures may have been added to document 514 by a user using a digital pen tool of an application displaying document 514 or using a digital pen device interacting with a touchscreen computing device. As illustrated, the ink gestures include proofreading marks or symbols which suggest edits to the text and a handwritten comment in the top margin of the document.

Figure 5B:
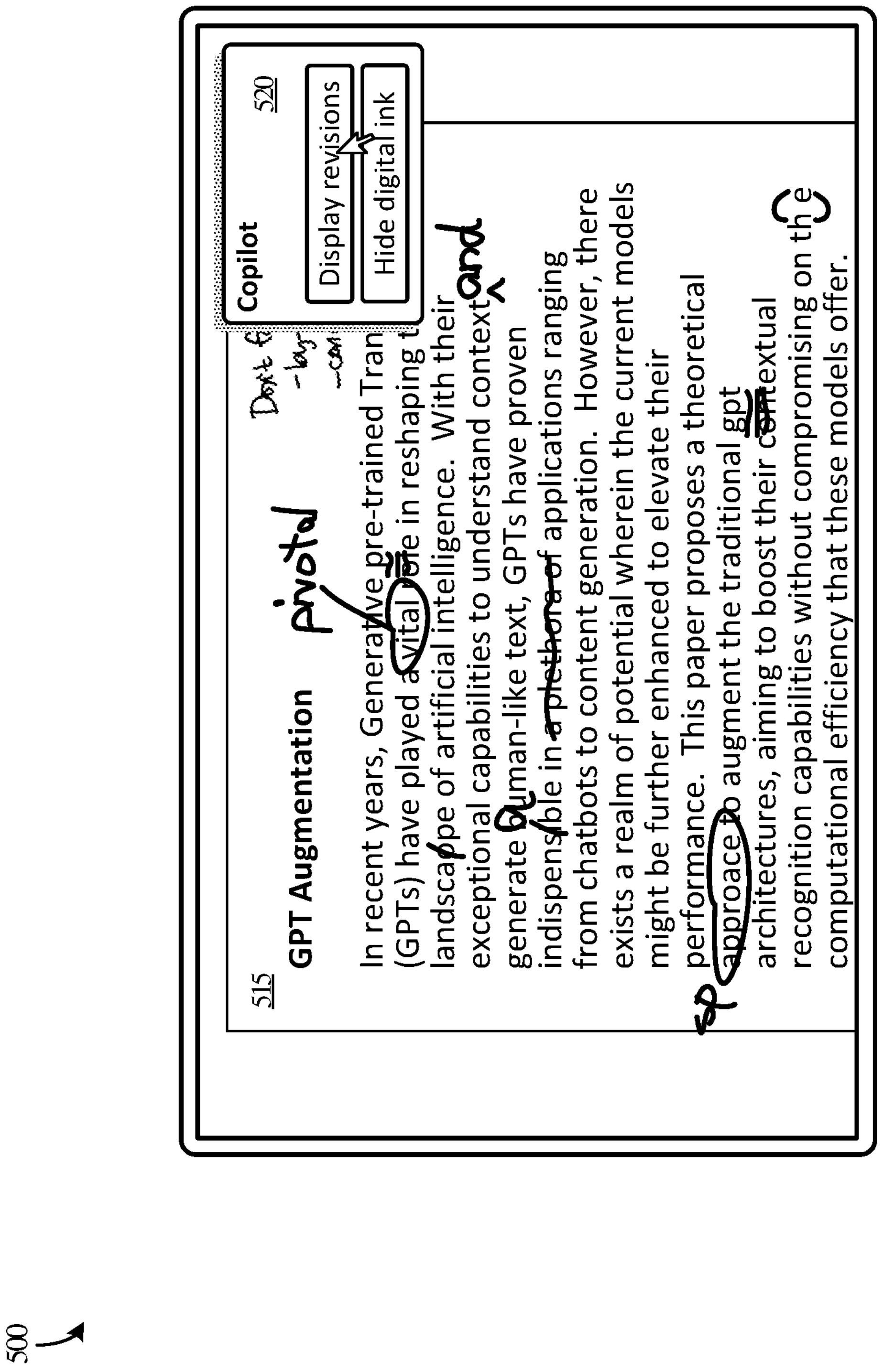

In FIG. 5B, application assistant pane 520, representative of a pane by which a user can interact with a service of the application, is surfaced in the user interface and includes graphical devices (e.g., buttons) by which a user can elect to display revisions based on the ink gestures or to hide the ink gestures. For the purpose of illustration, it will be assumed that the user elects to display revisions to the content based on the ink gestures. The user input causes the application hosting document 514 to prompt an LLM to suggest revisions indicated by the ink gestures. To identify the revisions, the LLM is supplied in the prompt with content from document 514 which is subject to the ink gestures or a document tree of document 515 (including content of document 515). The LLM also receives an interpretation or identification of various proofreading marks or symbols identified by an ink parser of the application along with an indication of where or to what portion of document 515 each mark or symbol is applied. The LLM also receives text that was recognized by the ink parser from among the ink gestures. For example, the ink parser identifies the text on the page: "Don't forget:-by-line-conclusion". The prompt includes the information indicating the text and that the text is located in the top margin of the document. In addition, the LLM is also supplied with an image of document 515 including the ink gestures which provide further context for the model to understand the ink gestures. The LLM is tasked with generating a set of suggested revisions to be applied to document 515 based on the ink gestures.

Figure 5C:
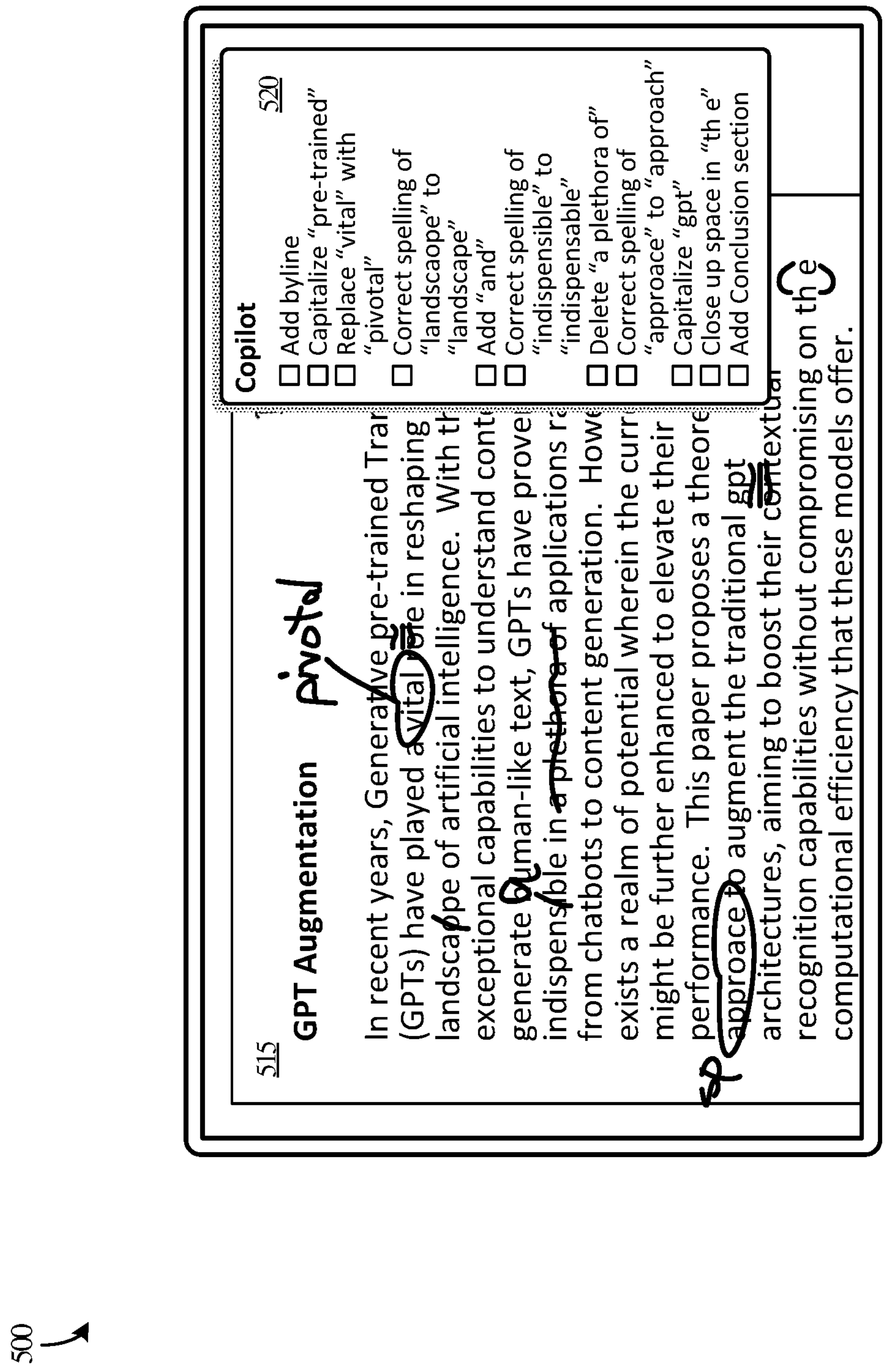

In FIG. 5C, application assistant pane 520 is displayed along with a natural language list of revisions generated by the model. The list may be used by the user to view the suggested revisions in document 515 and/or to selectively accept or reject the revisions. An implementation of user experience 500 illustrated in FIG. 5D depicts a revised version of document 515 incorporating the revisions suggested by the model, and application assistant pane 520 displays a graphical input device by which the user can accept the revisions. As illustrated in FIG. 5D, the revisions are underlined to make them visually distinct from the unaltered text. FIG. 5E illustrates an implementation of user experience 500 in which the user can accept revisions identified by the model by category in application assistant pane 520.

In some implementations, document 515 may include images, tables, or other types of document elements which are subject to editing via digital ink. As with textual content, the LLM receives document 515 in the form of a document tree and images of annotated portions of document 515 and generates suggested revisions to the document elements based on the ink gestures.

In some implementations, the prompt to the LLM instructs the model to return a request for document content on which a suggested revision depends but which was not supplied in the prompt. For example, a comment on a portion of document 515 may reference another page or paragraph of the document. The prompt may include the annotated portions but not the referenced portion. The model may return a request for the specified page or paragraph, in response to which the application generates and sends a follow-on prompt which includes the requested content.

In an implementation, the LLM is tasked with returning a confidence level with respect to its suggested revisions generated based on its interpretation of the ink gestures. The application may use the confidence level to automatically implement the high-confidence revisions and display the lower-confidence revisions as suggestions to the user, such as listing the lower-confidence revisions in an application pane for the user to view and accept or reject. For example, the application may automatically implement revisions which the LLM has scored as "high confidence" or at least 90% confidence and list the other, lower-confidence revisions as suggestions for the user to edit and/or selectively implement, such as in a "reviewing" mode of the application.

FIG. 6 illustrates prompt template 600 by which an application, of which application 120 of FIG. 1 is representative, hosting a digitally inked document can request revisions to the document from an LLM based on the ink gestures in an implementation. In prompt template 600, the LLM is tasked with recognizing handwritten edits applied to printed text in the document and applying the edits to the text. Prompt template 600 includes a field where the application can insert the text subject to the digital inking or a document tree including the inked text. Prompt template 600 may also include fields for other information for the model to use in identifying revisions. Prompt template 600 can include a field where the application includes output from the ink parser, such as information relating to the ink gestures (e.g., words or language recognized by OCR). Prompt template 600 may also include an image of the digitally inked text or a field for inserting a hyperlink to an image of the inked text. Although not shown, prompt template 600 could include other portions of the document which are not subject to inking revisions but which provide helpful context for the LLM to generate its suggested revisions.

In various implementations, the application configures a prompt based on a prompt template selected according to the complexity of the ink gestures. The complexity of the ink gestures may be determined from information generated by the ink parser, such as an indication of marks or symbols which cannot be identified by the parser. In some scenarios, the application may submit a prompt including the text content and an image of the digitally inked text, without output from the ink parser. In other cases, the application may submit a prompt including the text content along with the output of the ink parser, and either with or without an image of the inked text.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements ink editing process 706, which is (are) representative of the ink editing processes discussed with respect to the preceding Figures, such as process 200. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including ink editing process 706) may be implemented in program instructions and among other functions may, when executed by processing system 702, direct processing system 702 to operate as described with respect to the various operational scenarios, sequences, and processes illustrated herein. For example, software 705 may include program instructions for implementing an ink editing process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support ink editing in an optimized manner. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:

one or more computer readable storage media;

one or more processors operatively coupled with the one or more computer readable storage media; and program instructions stored on the one or more computer readable storage media that, when executed by the one or more processors, direct the computing apparatus to at least:

receive, in a user interface of an application, an ink gesture made by a user with respect to a document displayed in the user interface, wherein the ink gesture comprises ink strokes made on a portion of the document;

capture an image of the ink strokes on the portion of the document;

generate a prompt for a large language model to obtain suggested revisions to the document, wherein the prompt includes the image and a document tree indicative of a structure of the document; and surface, in the user interface, a suggested revision generated by the large language model in response to the prompt.

2. The computing apparatus of claim 1, wherein the prompt tasks the large language model with generating the suggested revisions to the document based on the image of the ink strokes on the portion of the document and in view of the document tree.

3. The computing apparatus of claim 2, wherein the prompt further comprises context information relating to the ink gesture, wherein the context information comprises a location in the document tree of the portion of the document subject to the ink gesture.

4. The computing apparatus of claim 3, wherein the portion of the document comprises a sentence, a paragraph, or a page of the document.

5. The computing apparatus of claim 4, wherein the prompt further includes a different portion of the document comprising a sentence, a paragraph, or a page of the document not subject to the ink gesture.

6. The computing apparatus of claim 1, wherein the response comprises a request by the large language model for a different portion of the document, wherein the different portion of the document is not captured in the image, and wherein the program instructions further direct the computing apparatus to send a second prompt to the large language model including the different portion of the document.

7. The computing apparatus of claim 1, wherein the program instructions further direct the computing apparatus to parse the ink gesture to determine a meaning represented by the ink gesture and include the meaning in the prompt.

8. The computing apparatus of claim 1, wherein the image comprises a screen capture in a JPEG or PNG format.

9. One or more computer readable storage media having program instructions stored thereon that, when executed by one or more processors, direct a computing device to at least:

receive, in a user interface of an application, an ink gesture made by a user with respect to a document displayed in the user interface, wherein the ink gesture comprises ink strokes made on a portion of the document;

generate a prompt for a large language model to obtain suggested revisions to the document, wherein the prompt includes an image of the ink strokes on the portion of the document, and wherein the prompt further includes a document tree indicative of a structure of the document; and surface, in the user interface, a suggested revision generated by the large language model in response to the prompt.

10. The one or more computer readable storage media of claim 9, wherein the prompt tasks the large language model with generating the suggested revisions to the document based on the image of the ink strokes on the portion of the document in view of the document tree.

11. The one or more computer readable storage media of claim 10, wherein the prompt further comprises context information relating to the ink gesture, wherein the context information comprises a location in the document tree of the portion of the document subject to the ink gesture.

12. The one or more computer readable storage media of claim 11, wherein the portion of the document comprises a sentence, a paragraph, or a page of the document.

13. The one or more computer readable storage media of claim 12, wherein the prompt further includes a different portion of the document comprising a sentence, a paragraph, or a page of the document not subject to the ink gesture.

14. The one or more computer readable storage media of claim 9, wherein the response comprises a request by the large language model for a different portion of the document, wherein the different portion of the document is not captured in the image, and wherein the program instructions further direct the computing device to send a second prompt to the large language model including the different portion of the document.

15. The one or more computer readable storage media of claim 9, wherein the program instructions further direct the computing device to parse the ink gesture to determine a meaning represented by the ink gesture and include the meaning in the prompt.

16. The one or more computer readable storage media of claim 9, wherein the image comprises a screen capture in a JPEG or PNG format.

17. A method of operating a computing device comprising:

receiving, in a user interface of an application, an ink gesture made by a user with respect to a document displayed in the user interface, wherein the ink gesture comprises ink strokes made on a portion of the document;

capturing an image of the ink strokes on the portion of the document;

generating a prompt for a large language model to obtain suggested revisions to the document, wherein the prompt includes the image and a document tree indicative of a structure of the document; and surfacing, in the user interface, a suggested revision generated by the large language model in response to the prompt.

18. The method of claim 17, wherein the prompt tasks the large language model with generating the suggested revisions to the document based on the image of the ink strokes on the portion of the document in view of the document tree.

19. The method of claim 18, wherein the prompt further comprises context information relating to the ink gesture, wherein the context information comprises a location in the document tree of the portion of the document subject to the ink gesture.

20. The method of claim 19, wherein the prompt further includes a different portion of the document not subject to the ink gesture.

* * * * *